Sept. 17, 1963 A. P. BENEDETTO 3,103,912
ROTATING MILKING AND HOUSING SYSTEM
Filed Jan. 2, 1962 3 Sheets-Sheet 1

INVENTOR.
AMEDEO P. BENEDETTO
BY
ATTORNEY

Sept. 17, 1963 A. P. BENEDETTO 3,103,912
ROTATING MILKING AND HOUSING SYSTEM
Filed Jan. 2, 1962 3 Sheets-Sheet 2

INVENTOR.
AMEDEO P. BENEDETTO
BY
ATTORNEY

Sept. 17, 1963   A. P. BENEDETTO   3,103,912
ROTATING MILKING AND HOUSING SYSTEM
Filed Jan. 2, 1962   3 Sheets-Sheet 3

INVENTOR.
AMEDEO P. BENEDETTO
BY
ATTORNEY 3,103,912
ROTATING MILKING AND HOUSING SYSTEM
Amedeo P. Benedetto, Wakefield, Mass., assignor to Roto-stalls Corporation, Kensington, N.H.
Filed Jan. 2, 1962, Ser. No. 163,589
6 Claims. (Cl. 119—14.04)

The present invention relates to improvements in dairy systems and more particularly to novel facilities for the housing, stabling, feeding, milking, and caring of farm animals, especially cattle.

God made cattle living creatures with individual minds of instinct. Each cow in a herd has its own characteristics. Therefore, these animals cannot be mechanized to automatically perform at any certain time, nor in exactly the same amount of time. In order to keep a herd of dairycows healthy, of good breeding quality, and efficiently producing milk, each animal must have the individual attention of a herdsman. This is especially true in the operations of feeding and milking.

There are two major types of dairy farm housing currently being used in the United States. One is referred to as "loose housing" and the other is called "stanchion barn housing." In loose housing, the animals are allowed to move about freely in a confined area consisting of feeding sheds, feed bunkers, open sheds for resting, paved yards, and paved passageways. In stanchion barn housing, the cows are tied up in comfortable individual stalls in rows, in a single, enclosed, air-conditioned, barn. This barn has a feed alley, feed trough, and water bowl at the front of each cow, plus a manure gutter and litter alley running along the rear of each cow. Of the two methods, stanchion barn housing is the older, more common and more efficient. With reference to feeding in both these types of housing, the modern trend is to bring cut forage from the fields to be fed automatically to the animals in confinement. In some cases, limited access is allowed to a small pasture for exercise and sunshine. Grain feeding is done only at the milking stalls.

With reference to milking, both loose housing and stanchion barn housing use a so-called "milking parlor" as the latest and most modern milking method. Briefly, the milking parlor is a separate building which contains two or more milking stalls on a raised platform situated along the sides of a shallow pit in the floor. All the devices necessary for the entire milking operation are located in and around this pit. During the milking operation, the herdsman is stationed in the milking pit in a comfortable, standing position, from which he can put two or more cows through a complete milking operation, and operate the mechanism which weighs, strains, and pumps the milk by pipelines to a refrigerated milk storage tank in a separate, adjoining milk room. A selected number of cows from either loose housing or stanchion barn housing are set loose and guided into a so-called "holding area." From the holding area, the cows are allowed to successively enter the milking parlor to take their positions in the milking stalls. The herdsman in the pit locks them in the stalls, feeds them the proper amount of grain, milks them, and then successively releases them from their stalls. The cows are then allowed to return to their housing area or pasture.

The major advantages of a dairy system using loose housing with a milking parlor can be listed as follows: 1. The machinery for forage feeding is of the low-cost type. 2. The machinery for manure cleaning is of the low-cost type. 3. The milking parlor position provides a more comfortable and faster milking operation. The major disadvantages of this system are as follows: 1. Cows do not get individual care. 2. Larger areas are needed for more buildings and paved yards. 3. Animal health and sanitation becomes a problem, especially in stormy weather.

The major advantages of a dairy system using stanchion barn housing with a milking parlor can be listed as follows: 1. Cows do get individual care. 2. All operations are done in one air-conditioned building. 3. Animal health and sanitation can be better controlled in any weather. The major disadvantages of this system are as follows: 1. Machinery for proper feeding is of the expensive type. 2. Machinery for proper manure cleaning is of the expensive type. 3. An extra herdsman is needed to loose and re-stanchion cows in the stall barn during the use of the milking parlor.

Therefore, the paradox in dairy farm systems as they are today can be stated in this manner. The major advantages of one system are the major disadvantages of the other system, and vice versa. With neither of these two systems is it possible to achieve maximum herd health, productivity, sanitation and efficiency at minimum cost. With the device of my present invention, namely, annular shaped, rotatable stalls, the facilities in my dairy animal system are so arranged that the animals in their individual stalls are brought to their feeding, cleaning, bedding, washing, milking and to whatever operation may be needed for the care of the animal. Thus, it is a new automated dairy system which will give the dairy farmer all the advantages, yet none of the disadvantages, of the systems presently known.

A primary object of my invention is to provide a dairy system which will be sanitary, economical, efficient and at the same time will preserve and promote the health and quality of our country's cattle.

A basic novel feature of this dairy system comprises movable stalls which form an annular shaped platform having a plurality of hinged stall floor doors covering stall floor cut-outs on the outer periphery of said platform, each of said stall floor doors being located between each pair of said movable stalls. The cows are stabled in these stalls which are placed radially around the periphery of said annular shaped platform. While in that relation in said stalls, the platform can be made to turn or remain stationary at will and then the stabled animals can be delivered to or from any point in the endless path of said platform. This enables the cows to be milked, fed, cleaned, bedded and subjected to any other necessary operation as they are delivered to and held for a suitable length of time at various stations, which are set up for said operations, along the circular route of travel of the endless turntable.

Another object of my invention is to provide a new and advantageous arrangement of the forage feed storage unit or silo. This forage feed storage unit, equipped with a conventional auger unloader, is stationary and is placed in the center of the entire system area. Said storage unit is surrounded by the annular shaped, movable platform with cows stabled thereon. This enables the animals to be fed forage feed individually, by the mechanical unloader, when they are made to successively arrive at the forage feed station in their movable stalls.

Another object of this invention is to locate the forage feed silo in the center of the system so that it protrudes through the center of the roof which will house the cattle while in their stalls so as to enable the forage feed silo to be used as a money-saving, strong, structural supporting member of the entire dairy barn and its roof.

Another object of this invention is to arrange the concrete, feed alley walkway completely around the base of the forage feed silo so as to allow complete access to the feed alley trough which is stationary and located next to the inner circumference of the radially placed stalls of the turntable. This enables the animals to be fed by hand in the conventional way if for any emergency reason whatsoever the turntable, with the cows stabled thereon, cannot be rotated.

Another object of this invention is to provide feed trough separators which are attached to and rotate with each stall. This allows better controlled forage feeding of individual animals and also enables the herdsman to clean the entire feed trough of dirt and leftover feed when he has allowed the turntable to make one complete revolution past the forage feed unloader and a leftover feed disposal opening located in the floor of the feed trough at one point of its circular path.

Another feature is to locate a manure gutter around and next to the outer circumference of the movable turntable. This gutter is stationary and is a depressed annular portion of the concrete floor. The turntable has a number of suitably hinged paddles firmly attached to its outer circumference. Said paddles are designed to fit the inner shape of the gutter. At a point in the periphery of the manure gutter, there is an opening in the floor which empties into a manure pit, conveyor, or manure wagon. This enables the turntable paddles to scrape and drag manure that accumulates in the gutter and dispose of it into the manure wagon with one complete revolution of the movable platform.

Another feature is to provide a stationary manure scraper which will ride over and press down on the stall floor at the outer periphery of turntable in the location of the animal's rear feet. This scraper bar enables the herdsman to drag back and dump into the manure disposal opening all dirty bedding and manure which may accumulate on the rear portion of the animal's stall floor. This is accomplished with each complete revolution of the turntable stalls conveyor.

A further object of my invention is to provide a concrete manure alley walkway next to the outer circumference of the gutter and surrounded by the interior wall of a round-shaped dairy barn. This allows complete access to the entire length of the manure gutter. This enables the manure to be removed by hand in the conventional way if for any emergency reason the turntable cannot be rotated.

A further object is to position a milking station in a shallow pit located in the periphery of the manure gutter. On the outer periphery of the turntable, sections of the stall floors are hinged and raisable between every other stall. This allows the herdsman access to the udders of the cows on both sides of the floor cutout when it is time to attach the milking mechanism to each cow. As in a milking parlor, this enables the herdsman to milk all the cows on the turntable individually without leaving his milking pit station, when he has caused the turntable to have rotated one complete revolution.

Another feature is to provide a storage unit for suitable bedding material. This bedding material bin will be constructed so that it can mechanically unload sawdust or shavings at a bedding station which will be located at a single point over the centerline of the annular shaped, rotatable stalls. This gives the herdsman a means whereby he can, when needed, put clean bedding in any amount on the stall floor of each cow on the turntable when he allows the turntable to make one complete revolution. This operation can be performed while the animals are still in their stalls or if the herdsman so desires, he can do it when the cows have left their stalls to go outdoors.

Another object is to provide such an apparatus which will rotate the cows into milking position at the milking pit station. As has been stated previously, the major feature of a milking parlor is the milking pit position of the herdsman. Thus, my invention enables the dairy farmer to have milking parlor comfort and speed for the milking operation without loosing, chasing or handling of cows, plus all the advantages of stanchion barn housing with stall bedding, forage feeding, feed trough cleaning and manure cleaning mechanism as automatic auxiliary actions at minimum cost.

Another object is to provide the means for milking within the dairy barn area and to have the milk pumped to a refrigerated milk-storage tank in the same manner that it is done in a milking parlor. This enables the milker to work in the warmth of the dairy barn. This eliminates the costly provision of a heating system for the milking operation as is needed today in the separate milking parlor buildings when they are used in cold climates.

Various other objects and advantages will become apparent from the detailed description of a dairy animal establishment embodying the general system of my invention to follow.

Figure 1:
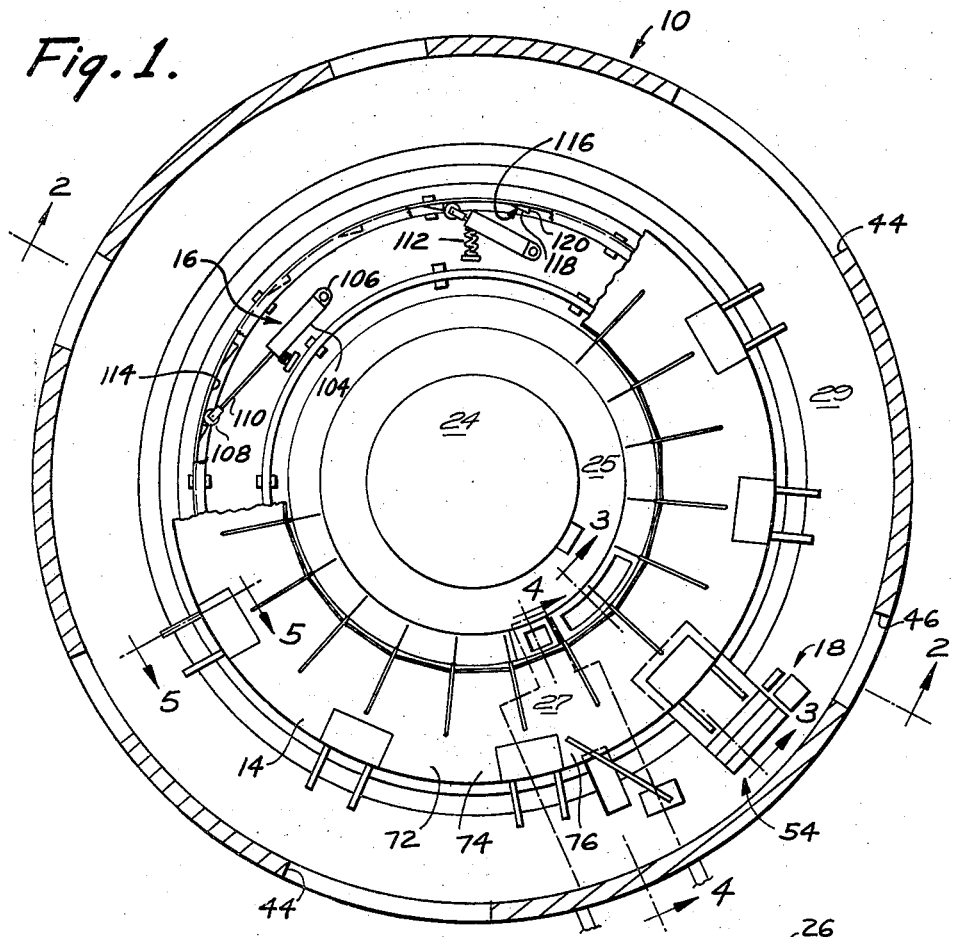
FIGURE 1 is a top plan view of my improved dairy system with the roof removed to show the interior layout.
Figure 2:
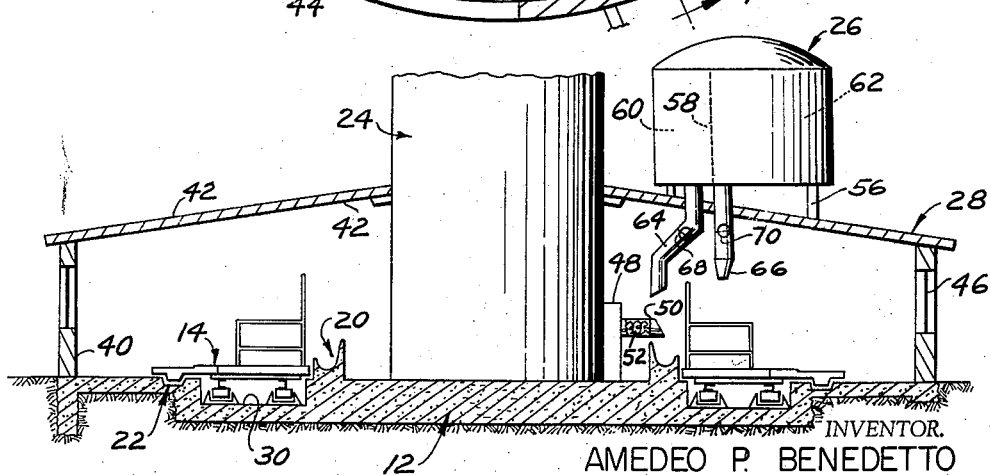
FIGURE 2 is a vertical sectional view taken substantially on the plane of line 2—2 in FIGURE 1.

Referring more particularly to the drawings, wherein like numerals apply to like parts throughout, and having reference first to FIGURES 1 and 2, it will be seen that I have provided an improved dairy system 10 which comprises a base or floor support 12, an annular conveyor platform 14, operating means 16 for effecting rotation of the platform 14, control means 18, a feed trough 20, manure gutter 22, a milking and control station 23, a forage feed silo 24 and a bedding and grain supply bin 26 mounted on the roof of the enclosure 28.

The base or floor support 12 may be of any suitable design such as a concrete slab. The concrete base 12 is formed with an annular recess in its top surface at 30 and has a pit formed therein for the milking and control station 23 as shown at 32. The base 12 is also formed with openings at 34 and 36 through which the unused feed and the manure can be passed for collection in a wagon, such as is shown at 38 in FIGURE 4, or other suitable means for manure disposal.

The enclosure 28 may be of any suitable exterior shape but as here shown is circular and includes a side wall 40 with a sloped roof 42 supported at its outer periphery on the side wall 40 and at its inner periphery on the annular flange 42 carried by the forage feed silo 24. The side wall 40 may be provided with a suitable doorway at 44 and a number of windows as at 46.

Figure 3:
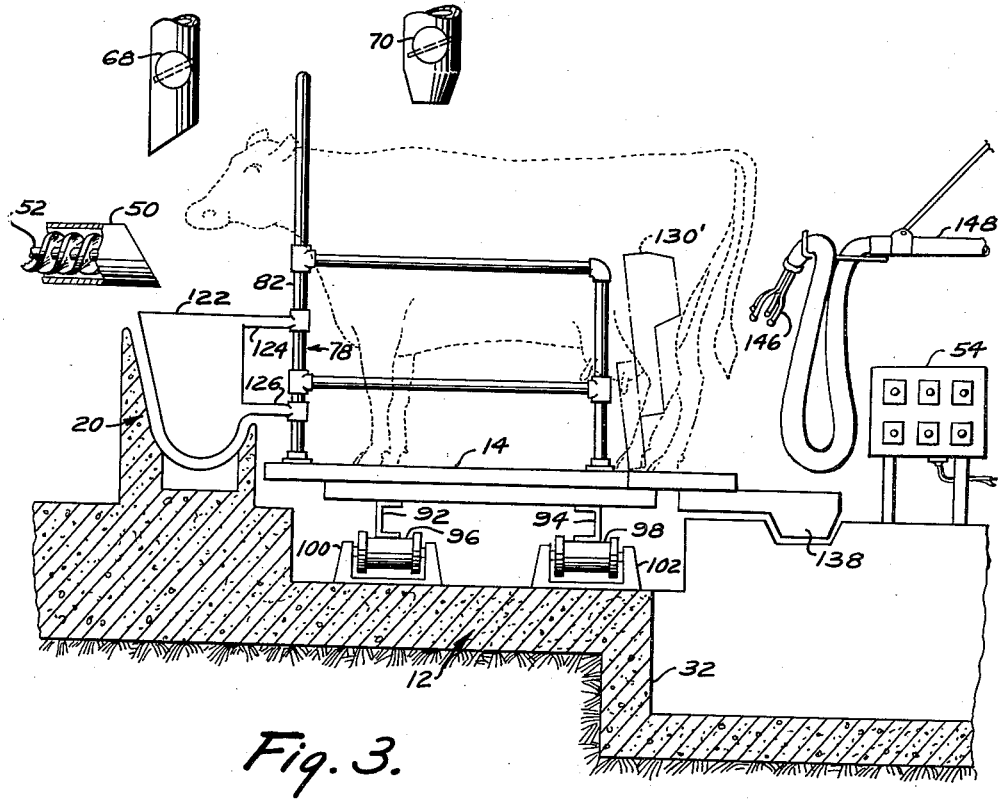
FIGURE 3 is a vertical sectional view taken substantially on the plane of line 3—3 in FIGURE 1.

The forage silo 24 may be of any suitable conventional design supported on the base 12 centrally of the enclosure 28 and mechanical feed means are associated with the silo 24 at 48 so as to feed the chopped forage feed through the pipe 50 by means of the auger 52 which is electrically controlled by operation of one of the switches on the control panel 54 as shown in FIGURE 3. The housing 48 may include a suitable motor (not shown) by which the auger 52 is driven.

The storage bin 26 may be varied in design, but preferably the bin 26 is supported on the roof 42 by the posts 56. The bin 26 is compartmented at 58 so as to include grain the section 60 and suitable bedding material, shavings or sawdust, in the section 62. The section 60 has a downspout 64 for feeding grain into the feed trough 20 and the downspout 66 is located to feed shavings or sawdust into a stall floor disposed therebelow. The downspouts 64 and 66 are valve controlled at 68 and 70 with suitable electrical motor means remotely operated at the control panel 54.

The feed trough 20 is of annular shape extending around the inner periphery of the platform 14 and may be formed of poured concrete as shown in FIGURE 3 or other suitable design may be employed. In the space between the feed trough and the silo 24 is a feed alley walkway 25 with an access passageway 27 being formed on the platform 14 as will be described.

The manure gutter is formed by an annular depression 22 formed in the base 12 adjacent the outer periphery of the platform 14.

Figure 7:
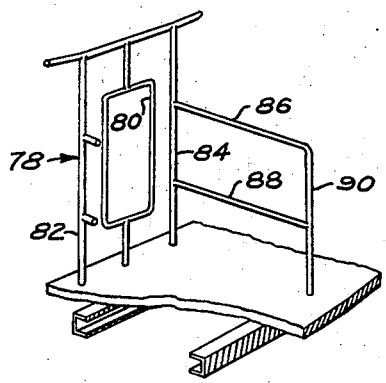
FIGURE 7 is a perspective view showing a stanchion for an animal at one stall of the system.

The annular platform 14 will now be described in detail. The platform 14 may be constructed of steel or other suitable material may be employed. The platform 14 includes a multiplicity of radial sections such as at 72, 74, 76, etc. as viewed in FIGURE 1, each section defining the area of a stall for a single animal. One of these stalls is open to provide the passageway 27 above described. A pipe framework is provided as shown at 78 in FIGURES 3 and 7 for separating the adjacent stalls and for supporting the conventional stanchion 80 at each stall for a respective animal. The particular construction and arrangement of the piping 78 may be varied but preferably includes two posts 82 and 84 between which the stanchion 80 is supported and horizontal side bars 86 and 88 joined to each of the vertical posts 82 and 84 and supported at their free end by a short vertical post 90 all mounted on the platform. Between every other stall at the rear edge where the stall floors meet there is a hinged stall floor door 134 covering a stall floor cut-out 128. This novel device is the means of accomplishing three actions which are very vital to this dairy system. First, it allows the herdsman access to the cows udder for attaching the milker 146. Secondly, it restrains the cows on either side of it from stepping into the floor cut-out 128 during milking. Thirdly, it provides a hinged member to which the gutter cleaning arms 136 can be attached.

The turntable 14 has a pair of tracks 92 and 94 of circular shape securely fastened on the underside thereof. Two series of rollers 96 and 98 are arranged in concentric circles beneath the tracks 92 and 94, respectively. The rollers 96 and 98 are rotatably journalled in supporting brackets 100 and 102, respectively, which are supported on the base 12 beneath the platform 14. It will thus be seen that the platform 14 is freely supported on the rollers 96 and 98 for movement thereon.

Around the platform and within the enclosure is a concrete manure gutter walkway 29.

As viewed in FIGURE 1, the means for effecting rotational movement of the platform will be seen to comprise a series of hydraulic rams 104 which are pivotally secured at one end 106 to the base 12. A roller 108 is carried at the free end of the piston rod 110 of the cylinder 104 and the housing of the cylinder 104 is spring-loaded as shown at 112 so as to be urged outwardly against the rail 114. The rail 114 is of channel shape so as to guidingly receive the roller 108 therein. Periodically, the rail is provided with a push cog 116 with an incline at one side at 118 and an operating surface on the other side at 120. As the platform rotates, the roller 108 will ride over the incline 118 and seat against the operating surface 120 and upon operation of the cylinder 104, the entire platform will be rotated to the extent of a single stall whereupon the cylinder piston is retracted to pull the roller back for a successive operation. It will be obvious that the cylinders can be so arranged that one set will operate when the other set is being retracted in readiness for placing in position for operation. In this fashion, by operation at the control panel 54, the entire platform 14 can be rotated periodically to move successive stalls into position at the milking station pit 32.

Having reference to FIGURE 3, it will be seen that a series of paddles are provided at 122 conforming to the shape of the feed trough 20 and supported on the posts 82 and 84 by the arms 124 and 126. Thus, as the platform 14 is moved, the paddles 122 will carry the forage feed from beneath the forage dispenser pipe 50 and force the feed to travel around the extent of the feed trough in front of each individual animal to be fed.

Figure 5:
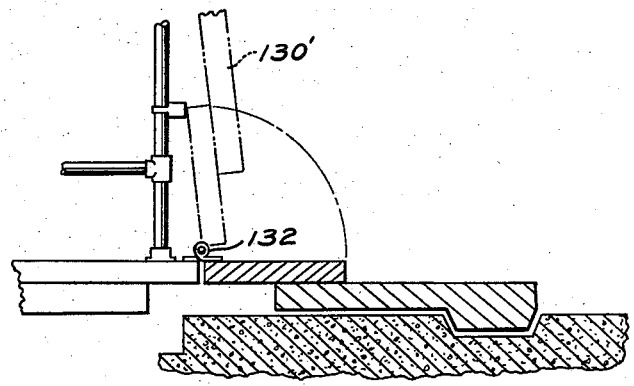
FIGURE 5 is a vertical sectional view taken substantially on the plane of line 5—5 in FIGURE 1.
Figure 6:
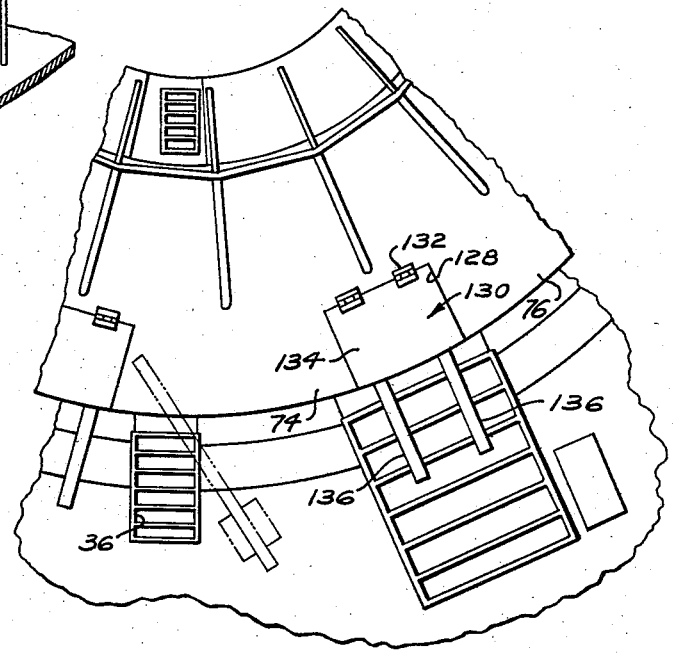
FIGURE 6 is an enlarged detail view of the milking station of the dairy system.

Intermediate each pair of stalls such as at 74 and 76, as viewed in FIGURE 6, the platform is cut away as at 128 and gutter cleaner means 130 is hingedly carried in the opening 128 by the hinges 132 as viewed in FIGURE 5. The means 130 which serves as a means of access for milking the animals, means for restraining the animals, and means to which the gutter cleaning arms are attached includes a section of the stall floor 134 with a pair of arms 136 rigidly extending outwardly therefrom with scraper portions 138 on the underside thereof conforming to the shape of the manure gutter 22. Thus, as the platform 14 is moved progressively, the gutter scrapers will force the manure around to the discharge opening 36 for collection in the wagon 38 as will be obvious. The means 130, inasmuch as they are hingedly mounted at 132, can be moved to a vertical position as shown in dotted lines at 130' in FIGURES 3 and 5. In this position, the arms 136 will be in position to restrain the animals at the milking station and thereby allow the animals to be milked from the milking pit by a herdsman in a standing position.

Figure 4:
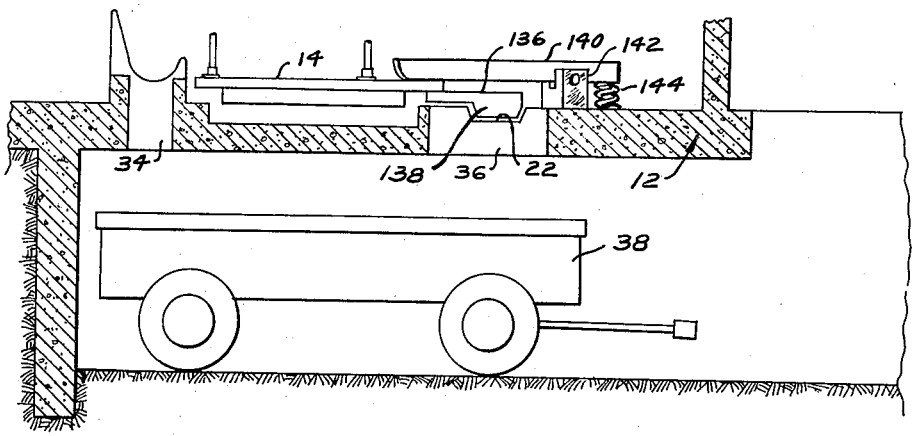
FIGURE 4 is a vertical sectional view taken substantially on the plane of line 4—4 in FIGURE 1.

Looking now at FIGURES 4 and 6, it will be seen that I provide at least one manure scraper 140 for the purpose of scraping manure from the top of the platform adjacent its outer periphery. The manure scraper 140 is pivotally mounted on the supports 142 carried on the base 12 and has spring means 144 for resiliently urging the scraper 140 down on to the top surface of the platform 14. The scraper 140 is located at an angle to the radial of the platform so that as the platform is progressively moved, the manure will be scraped by the scraper 140 through the discharge opening 36. Each animal will step over this scraper with their hind feet as they pass this point in the movement of their stalls.

At the milking station 23, the operator may control operation of all of the above described components. Suitable conventional milking apparatus is provided at 146 and is connected to the pipe 148 which in turn communicates with the refrigerated milk storage tanks (not shown). The operator stands in the pit 32 and raises the means 130 to its up position and attaches the milking apparatus 146 to the cow. By operation of the switches on the control panel 54, the operator feeds a supply of grain to the cow or cows being milked and also releases a supply of fresh bedding including shavings or sawdust into the stall. Upon completion of the milking operation, the operator lowers the stall floor door onto the stall floor cut out. Then he actuates a switch on the panel 54 whereby the pistons 104, above described, are operated to move the platform progressively around its axis so as to position the next pair of cows to be milked adjacent the milking station. The operator then lifts the next gutter scraper into position to restrain the cows juxtaposed thereto and allow him to enter the cut-out 128 to attach the milking apparatus 146 to the next pair of cows.

The operator also controls the flow of forage into the feed trough 20 and as the cows are moved from the milking station, they are free to feed on the forage.

It will be understood that the animals may be washed and cleaned and sprayed as desired in the system as here described.

By operation of the foregoing system, it will be obvious that the leftover feed and manure will be disposed of through the discharge openings 34 and 36 into the wagon 38 below the base 12 for removal thereby.

In view of the foregoing, it is believed that I have provided an improved dairy system which fulfills the objects hereinbefore enumerated.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

I claim:

1. A dairy system comprising a base, an enclosure, a silo for forage feed, an annular platform rotatably supported within said enclosure and around the axis of said silo, means operatively connected to said platform effecting rotation thereof, control means for effecting selective intermittent operation of said means, said platform having radial stall means dividing the same into a multiplicity of stalls each adapted to receive an animal therein, a stationary annular feed alley trough at the inner periphery of said platform, conveyor means providing communication between said silo and said trough for conveying forage feed to said trough, a manure gutter on said base at the outer periphery of said platform, a discharge opening through said base for communication with a collection station, a series of gutter cleaners carried by said platform for rotation therewith and extending into said gutter to convey manure from adjacent each stall to said discharge opening, a plurality of stall floor doors being hingedly attached to said platform so as to be moved to an "up" position from a gutter scraping position, said stall floor doors being located intermediate adjacent stalls so that when in an "up" position they are in position to restrain movement of animals juxtaposed thereto, and a milking and control station pit at the outer periphery of said platform.

2. A dairy system comprising a base, an enclosure, a central silo for forage feed, an annular platform rotatably supported within said enclosure and around the axis of said silo, means operatively connected to said platform effecting rotation thereof, control means for effecting selective intermittent operation of said means, said platform having radial stall means dividing the same into a multiplicity of stalls each adapted to receive an animal therein, a stationary annular feed alley trough at the inner periphery of said platform, conveyor means providing communication between said silo and said trough for conveying forage feed to said trough, paddle means carried by said platform and extending into said trough so as to move with said platform and convey measured amounts of forage feed throughout the extent of said trough, a manure gutter on said base at the outer periphery of said platform, a discharge opening through said base for communication with a collection station, a series of gutter cleaners carried by said platform for rotation therewith and extending into said gutter to convey manure from adjacent each stall to said discharge opening, a plurality of stall floor doors being hingedly attached to said platform so as to be moved to an "up" position from a gutter scraping position, said stall floor doors being located intermediate adjacent stalls so that when in an "up" position they are in position to restrain movement of animals juxtaposed thereto, and a milking and control station pit at the outer periphery of said platform.

3. A dairy system comprising a base, a feed silo, an annular platform rotatably supported, means operatively conected to said platform effecting rotation thereof, control means for effecting selective intermittent operation of said means, said platform having radial stall means dividing the same into a multiplicity of stalls each adapted to receive an animal therein, a stationary annular feed alley trough at the inner periphery of said platform, conveyor means providing communication between said silo and said trough for conveying feed to said trough, paddle means carried by said platform and extending into said trough so as to move with said platform and convey measured amounts of feed throughout the extent of said trough, a manure gutter on said base at the outer periphery of said platform, a discharge opening through said base for communication with a collection station, a series of gutter cleaners carried by said platform for rotation therewith and extending into said gutter to convey manure from adjacent each stall to said discharge opening, a plurality of stall floor doors being hingedly attached to said platform so as to be moved to an "up" position from a gutter scraping position, said stall floor doors being located intermediate adjacent stalls so that when in an "up" position they are in position to restrain movement of animals juxtaposed thereto, a milking and control station pit at the outer periphery of said platform, and at least one manure scraper mounted on said base and contacting the top surface of said platform at its outer periphery so as to scrape manure from said platform into said gutter, each said manure scraper being pivotally mounted and having resilient means urging the same into contact with said platform.

4. A dairy system comprising a base, an enclosure, a central silo for forage feed, an annular platform rotatably supported within said enclosure and around the axis of said silo, means operatively connected to said platform effecting rotation thereof, control means for effecting selective intermittent operation of said means, said platform having radial stall means dividing the same into a multiplicity of stalls each adapted to receive a cow therein, a stationary annular feed alley trough at the inner periphery of said platform, conveyor means providing communication between said silo and said trough for conveying forage feed to said trough, a grain storage bin over said platform, means selectively operable to convey grain from said bin into said trough at at least one of said stalls, a manure gutter on said base at the outer periphery of said platform, a discharge opening through said base for communication with a collection station, a bedding storage bin over said platform, means selectively operable to convey bedding from said bin into at least one of said stalls, and a milking and control station pit at the outer periphery of said platform.

5. In an animal system comprising in combination a base, an enclosure, a feed storage unit, an annular platform rotatably supported within said enclosure, means operatively connected to said platform effecting rotation thereof, control means for effecting selective intermittent operation of said means, said platform having radial stall means thereon each adapted to receive an animal therein, an annular feed trough at the inner periphery of said platform, suitable conveyor means providing communication between said feed storage unit and said trough for conveying feed to said feed trough paddle means attached to said platform and extending into said feed trough, a manure gutter on said base at the outer periphery of said platform conveyor, at least one discharge opening through said base for communication with a collection station, a bedding storage bin, means selectively operatable to convey bedding material from said bin into said stalls, a grain storage bin, means selectively operable to convey grain from said bin into said feed trough at at least one of said stalls, a milking and control station pit at the outer periphery of said platform conveyor, at least one manure scraper mounted on said base and contacting the top surface of said platform at its outer periphery so as to scrape manure from said platform top into said manure gutter and a series of gutter paddles, said gutter paddles being attached to a cut-out section of intermediate adjacent stall flooring, said sections of stall flooring being hingedly attached to said platform so as to be moved to an "up" position from a gutter scraping position, said hingedly attached stall flooring with gutter paddles attached thereto when in an "up" position being in a position to restrain movement of an animal juxtaposed thereto and at the same time allowing access to each animal's udder for milking.

6. In an animal system, a rotary platform rotatably supported, means operatively connected to said platform to effect selective intermittent rotation thereof, said platform having stall means thereon each adapted to stable an animal therein, a plurality of stall floor cut-out sections located at the outer periphery of said platform, each of said cut-out sections being covered by a hinged stall floor door, a series of manure paddles attached to each of said stall floor doors, and a series of feed paddles attached to the inner periphery of said rotary platform.

References Cited in the file of this patent

UNITED STATES PATENTS

| | | |
|---|---|---|
| 1,968,564 | Luks | July 31, 1934 |
| 2,305,259 | Jeffers | Dec. 15, 1942 |
| 2,358,000 | Cornell | Sept. 12, 1944 |
| 2,938,497 | Bruecker | May 31, 1960 |

FOREIGN PATENTS

| | | |
|---|---|---|
| 35,532 | Denmark | Jan. 12, 1926 |
| 46,217 | Denmark | Sept. 8, 1932 |
| 69,909 | Denmark | Sept. 5, 1949 |